(12) United States Patent
Ando

(10) Patent No.: US 6,693,414 B2
(45) Date of Patent: Feb. 17, 2004

(54) POWER SUPPLY APPARATUS

(75) Inventor: Toshizumi Ando, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/216,945

(22) Filed: Aug. 12, 2002

(65) Prior Publication Data

US 2003/0071602 A1 Apr. 17, 2003

(30) Foreign Application Priority Data

Aug. 13, 2001 (JP) ........................................ 2001-245585

(51) Int. Cl.⁷ ................................................. G05F 5/00
(52) U.S. Cl. ..................................................... 323/303
(58) Field of Search .............................. 323/299, 303, 323/349, 350, 351; 363/59, 60

(56) References Cited

U.S. PATENT DOCUMENTS 5,729,098 A * 3/1998 Konopka et al. ........... 315/307
5,737,208 A * 4/1998 Chen .......................... 363/133
5,832,324 A * 11/1998 Shimizu et al. ............. 396/303
6,198,257 B1 * 3/2001 Belehradek et al. ........ 323/222

* cited by examiner

Primary Examiner—Matthew V. Nguyen
(74) Attorney, Agent, or Firm—Frommer Lawrence & Haug LLP; William S. Frommer

(57) ABSTRACT

A power supply apparatus includes an interface microcomputer driven by the output voltage from a first voltage transducer circuit for boosting the output voltage of a DC power supply. The interface microcomputer outputs an activation signal for activating a control IC. When a switch receives the activation signal from the control IC, the switch becomes conducting and applies the output voltage from the first voltage transducer circuit to the control IC. A delay circuit delays the activation signal from the interface microcomputer for a predetermined period of time and supplies the delayed activation signal to the control IC, thus causing the control IC to start controlling the operation of a voltage output unit. A second voltage transducer circuit for boosting the output voltage of the DC power supply and outputting a voltage of 5 V includes a charge pump circuit at the output stage thereof.

9 Claims, 9 Drawing Sheets

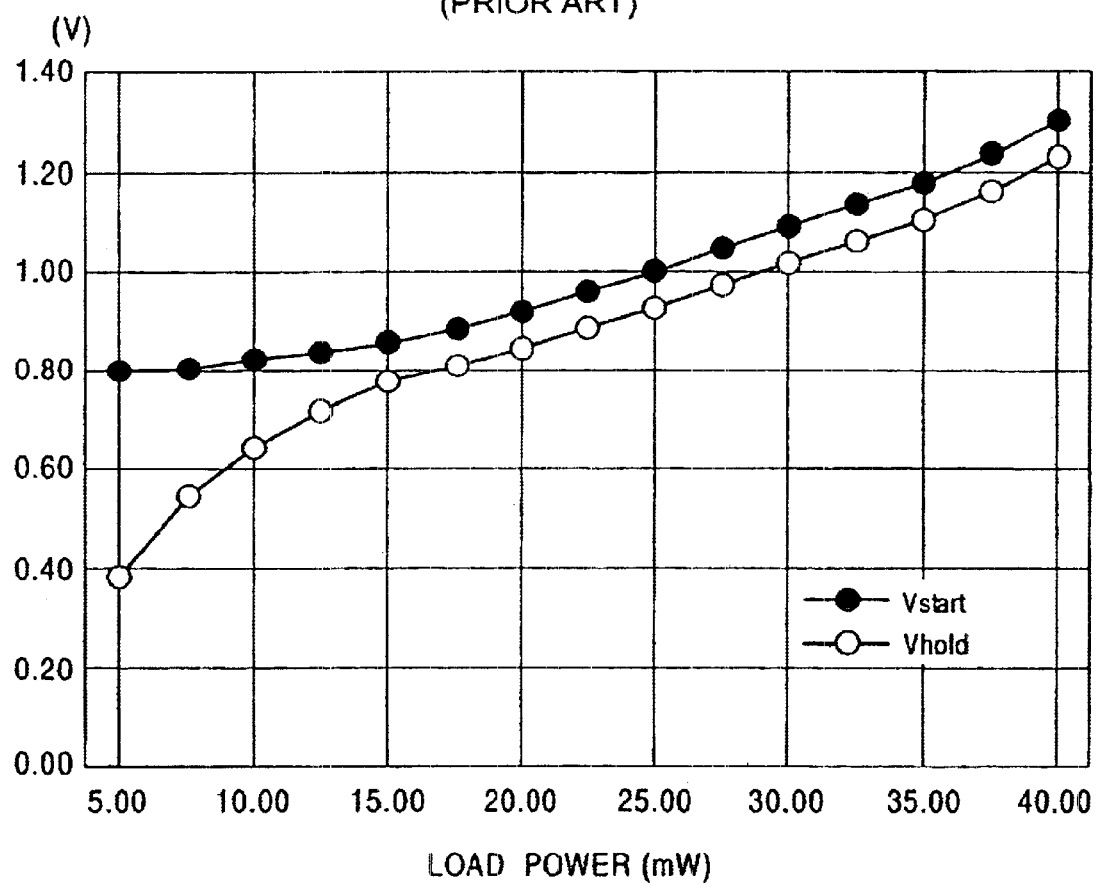

POWER SUPPLY APPARATUS

BACKGROUND OF THE INVENTION

1. Field of the Invention

The present invention relates to power supply apparatuses for regulating a voltage generated by a DC power supply and outputting the regulated voltage.

2. Description of the Related Art

Recently, many electronic apparatuses that use dry cells, such as nickel-cadmium batteries and nickel-metal-hydride batteries, as the power supply source have become generally used. Since these dry cells have relatively low output voltage ranges, the voltage that can be supplied by the dry cell does not necessarily match the voltage used by the electronic apparatus. Thus, the output voltage of the dry cell is converted by a voltage transducer, which is referred to as a DC/DC converter. As a result, the power supply voltage can be stably supplied to an electronic circuit.

FIG. 8 shows an example of the configuration of a known step-up voltage transducer circuit.

A voltage transducer circuit 100 shown in FIG. 8 is a step-up converter for boosting an input voltage and outputting the boosted voltage. In the voltage transducer circuit 100, the drain of a transistor Q21 is connected via a choke coil L21 to a power supply terminal 12a, and the source is grounded. A pulse input terminal 12b for receiving a switching pulse from an oscillation circuit (PWM: Pulse Width Modulator) (not shown) is connected to the gate. The anode of a diode (Schottky diode) D21 is connected to the node between the transistor Q21 and the choke coil L21. A capacitor C21 is connected to the cathode of the diode D21. The other end of the capacitor C21 is grounded. An output terminal 12c (to a load) and a feedback terminal 12d (to an error amplifier) are connected to the node between the diode D21 and the capacitor C21.

The transistor Q21 is an n-channel MOS-FET (Metal Oxide Semiconductor-Field Effect Transistor). In accordance with a switching pulse from the pulse input terminal 12b, the transistor Q21 enters an ON or OFF state, thereby functioning as a switching element. When the transistor Q21 is changed from ON to OFF in response to a switching pulse, energy excited by the choke coil L21 is released to the node between the choke coil L21 and the diode D21. As a result, a voltage higher than that of the power supply terminal 12a is generated, and the capacitor C21 is charged. Subsequently, the voltage at the node gradually decreases. When the transistor Q21 is turned ON the next time, the voltage at the node becomes substantially equal with the ground voltage. Accordingly, a voltage fluctuation in response to the switching pulse occurs at the anode of the diode D21. The fluctuation is rectified by the diode D21, thus generating a voltage higher than the input voltage. The voltage is smoothed by the capacitor C21, the smoothed voltage is removed from the output terminal 12c, and the voltage is supplied to the load.

The feedback terminal 12d outputs the same voltage as that of the output terminal 12c, and the output voltage is supplied to the error amplifier (not shown). At the error amplifier, the voltage output from the feedback terminal 12d is compared with a predetermined voltage. In accordance with the comparison signal, a switching pulse output from the oscillation circuit is controlled.

In many cases, a power supply apparatus using a dry cell generally has an output voltage of around 1 V. On the other hand, when a voltage less than or equal to approximately 1 V is input to a power supply apparatus using a known voltage transducer circuit, such as the foregoing voltage transducer circuit 100, the power supply apparatus having a relatively large load cannot be activated. Even if the power supply apparatus can be activated, the subsequent operation may become unstable. FIG. 9 is a graph showing an example of the relationship between load power and starting voltage of a known power supply circuit.

FIG. 9 shows the relationship of load power with a starting voltage (Vstart) of the known power supply circuit and the minimum allowable input voltage (Vhold) for stably operating the power supply circuit. According to FIG. 9, when the load power is less than or equal to approximately 25 mW, the power supply circuit can be activated by an input voltage ranging from approximately 0.8 to 1.0 V. As the load power increases, the starting voltage also increases. When the load power is greater than or equal to 25 mW, the starting voltage increases substantially in proportion to the load power.

According to FIG. 9, if the input voltage slightly decreases relative to the starting voltage subsequent to activation, the power supply circuit can be normally operated. When the load power is less than or equal to approximately 15 mW, the minimum allowable range increases as the load power decreases. When the load power is greater than or equal to 15 mW, the minimum allowable range is smaller and changes at an approximately constant rate.

When the voltage input to the known power supply apparatus slightly falls below 1 V, if the load power is approximately 25 mW, the known power supply apparatus can be activated and operated normally. If the load power is greater than 25 mW, the known power supply apparatus cannot be activated. When the input voltage decreases after activation, the operation of the known power supply apparatus may become unstable since the range in which the power supply apparatus can be normally operated is small. These problems may be caused by the fact that the oscillation circuit for outputting a switching pulse cannot oscillate normally due to a low voltage or the fact that normal switching operation for the choke coil cannot be performed since the gate voltage of a switching element (FET) in the voltage transducer circuit is too small.

In a power supply apparatus which uses the voltage transducer circuit 100 arranged as shown in FIG. 8 and which supplies a constant voltage generated by boosting an input voltage to a load, if the input voltage is less than a predetermined voltage, it is necessary to increase the step-up ratio. If Ton represents time during which the transistor Q21 in the voltage transducer circuit 100 is turned ON and Toff represents time during which the transistor Q21 is turned OFF, the relationship between the input voltage Vin from the power supply terminal 12a and the output voltage Vout from the output terminal 12c can be represented as:

$$Vout = \frac{(Ton + Toff) \times Vin}{Toff} \quad (1)$$

When a dry cell is used as the power supply source for the voltage transducer circuit 100, Vin may be a value around 1 V. If, for example, Vin is 1 V and Vout is 5 V, then the ratio Ton:Toff=4:1, and the duty ratio in the Ton period is 80%. In this case, if the input voltage becomes smaller than 1 V, the duty ratio may be further biased. When the load is large, activation may become difficult, and the stability during the normal operation may deteriorate.

SUMMARY OF THE INVENTION

In view of the foregoing problems, it is an object of the present invention to provide a power supply apparatus capable of stably operating while having a high load even when an input voltage is low.

According to the present invention, the foregoing objects are achieved through provision of a power supply apparatus for regulating a voltage generated by a DC power supply and for outputting the voltage to a predetermined load. The power supply apparatus includes a first voltage transducer for boosting the voltage generated by the DC power supply; a second voltage transducer for converting the voltage generated by the DC power supply to a predetermined voltage and for outputting the converted voltage to the predetermined load; an operation controller driven by an output voltage from the first voltage transducer, the operation controller outputting a switching pulse in accordance with reception of an activation signal and controlling the operation of the second voltage transducer; and an activation controller for inputting the output voltage from the first voltage transducer to the operation controller and, after a predetermined period of time, inputting the activation signal to the operation controller.

In the power supply apparatus, the voltage generated by the DC power supply is boosted by the first voltage transducer, and the boosted voltage is supplied to the operation control circuit for the second voltage transducer. Under the control of the activation controller, after a predetermined period of time has passed since the output voltage from the first voltage transducer was started to be supplied to the operation controller, the operation controller receives the activation signal. Accordingly, the operation control circuit outputs the switching pulse, thus starts controlling the operation of the second voltage transducer driven by the output voltage from the DC power supply. For example, the second voltage transducer includes the charge pump circuit at the output stage.

Accordingly, when the output voltage of the DC power supply decreases under a heavy load, the operation controller can be reliably activated by a voltage boosted by the first voltage transducer, and hence the operation controller can control the second voltage transducer in a stable manner. Since, for example, the second voltage transducer includes the charge pump circuit at the output stage, in addition to the stable operation of the operation control circuit, even if the step-up ratio is high, the output voltage of the DC power supply is not reduced, and the second voltage transducer can reliably output a voltage to the heavy load.

BRIEF DESCRIPTION OF THE DRAWINGS

FIG. 9 is a graph showing an example of the relationship between load power and a starting voltage in a known power supply circuit.

DESCRIPTION OF THE PREFERRED EMBODIMENTS

Embodiments of the present invention will now be described with reference to the drawings.

Figure 1:
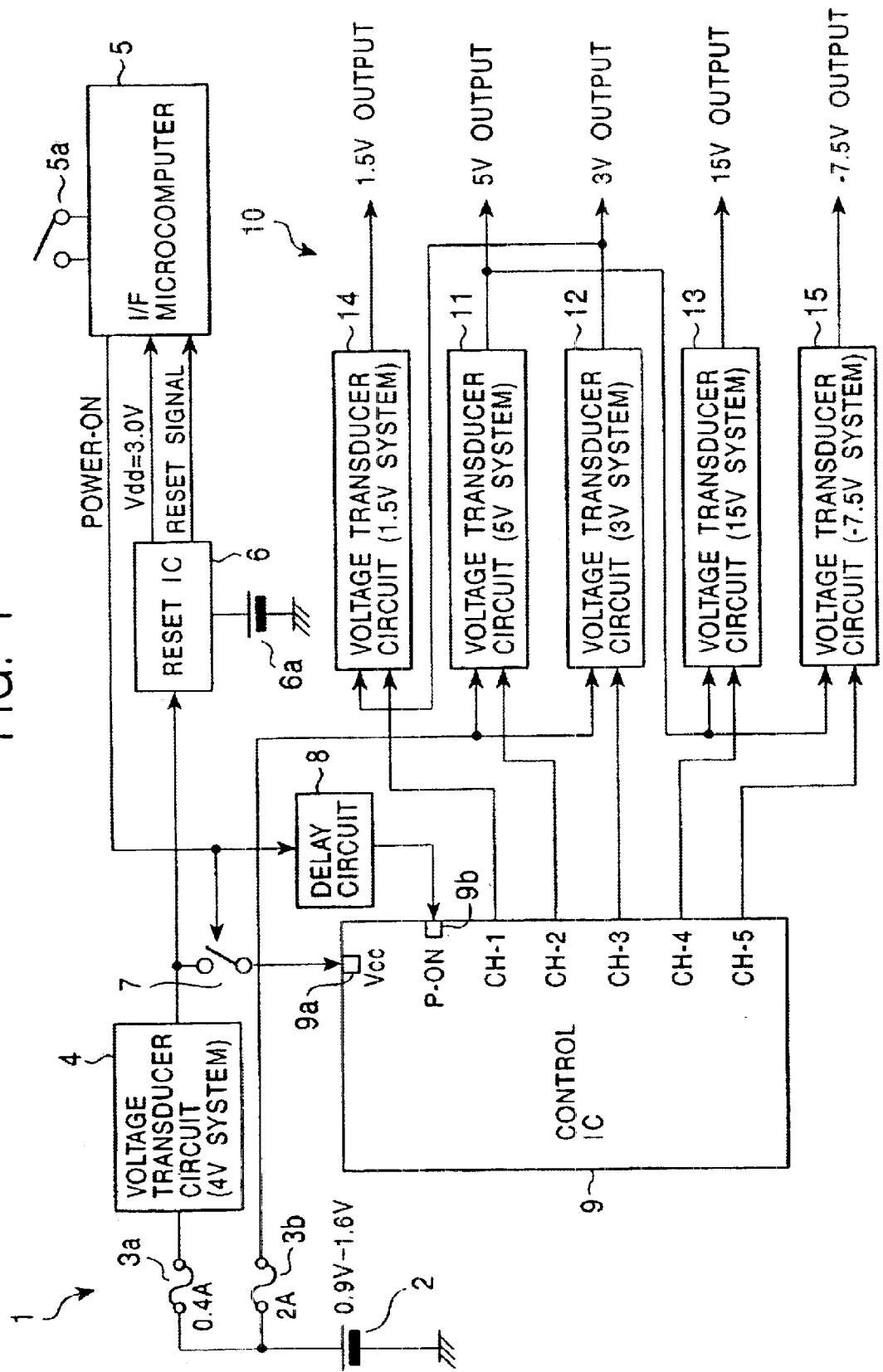
FIG. 1 is a block diagram showing the schematic configuration of a power supply apparatus according to the present invention.

FIG. 1 shows the schematic configuration of a power supply apparatus according to the present invention.

A power supply apparatus 1 shown in FIG. 1 includes a DC power supply 2, which is a power supply source, fuses 3a and 3b for protecting the wiring from the DC power supply 2, a voltage transducer circuit 4 for boosting the output voltage from the DC power supply 2, an interface microcomputer 5 for activating a control IC 9 described below, a reset IC 6 for supplying power to the interface microcomputer 5, a switch 7 for opening and closing the output line from the voltage transducer circuit 4, a delay circuit 8 for delaying an activation signal form the interface microcomputer 5, the control IC 9 driven by the output voltage from the voltage transducer circuit 4, and a voltage output unit 10 for supplying a predetermined voltage to a predetermined external load.

The voltage output unit 10 includes five channels of voltage transducer circuits 11, 12, 13, 14, and 15. The voltage transducer circuits 11, 12, and 13 are step-up converters for outputting voltages of 5 V, 3 V, and 15 V, respectively. The voltage transducer circuit 14 is a step-down converter for outputting a voltage of 1.5 V. The voltage transducer circuit 15 is an inverter converter for outputting a voltage of −7.5 V. Accordingly, the voltage output unit 10 can supply voltages of 5 V, 3 V, 15 V, 1.5 V, and −7.5 V to the load.

The power supply apparatus 1 is a power supply source using a dry cell, such as a nickel-cadmium battery or a nickel-metal-hydride battery. The output voltage of the power supply apparatus 1 ranges from 0.9 to 1.6 V. The breaking capacities of the fuses 3a and 3b are 0.4 A and 2 A, respectively. The voltage transducer circuit 4 receives a voltage supplied from the DC power supply 2 via the fuse 3a, boosts the voltage to a relatively high voltage (4 V in this case) higher than the input voltage, and outputs the boosted voltage to the reset IC 6 and the switch 7.

The reset IC 6 has a backup function for an internal clock of the interface microcomputer 5 using a backup power supply 6a. The reset IC 6 includes therein a series regulator. The reset IC 6 converts the output voltage from the voltage transducer circuit 4 to a voltage of 3 V and supplies the converted voltage as power supply to the interface microcomputer 5. When the DC power supply 2 is connected to the power supply apparatus 1, the reset IC 6 outputs a reset signal to the interface microcomputer 5 and activates the interface microcomputer 5. The interface microcomputer 5 includes a power supply switch 5a for activating the power supply apparatus 1. In response to the operation of the power supply switch 5a, the interface microcomputer 5 outputs an activation signal to the switch 7 and the delay circuit 8.

The switch 7 is turned ON when the switch 7 receives the activation signal from the interface microcomputer 5. Accordingly, the output voltage from the voltage transducer circuit 4 is supplied to a power supply terminal 9a included in the control IC 9. The delay circuit 8 delays the activation signal from the interface microcomputer 5 for a predetermined period of time and supplies the delayed activation signal to an activation control pin 9b included in the control IC 9.

The control IC 9 receives power supplied from the voltage transducer circuit 4 via the power supply terminal 9a, receives the activation signal from the activation control pin 9b, performs activation, and outputs a switching pulse to the voltage transducer circuits 11 to 15 of the voltage output unit 10, thereby controlling the operation of each portion. In the control IC 9, error amplifiers (not shown) corresponding to the voltage transducer circuits 11 to 15 and an oscillation circuit (not shown) for oscillating a switching pulse are integrally integrated. The output voltages from the voltage transducer circuits 11 to 15 are fed back to the corresponding error amplifiers, and these voltages are compared with predetermined voltages. In accordance with the comparison signals, the switching pulse output from the oscillation circuit is controlled.

In the voltage output unit 10, the voltage transducer circuits 11 and 12 are operated by power supplied from the DC power supply 2 via the fuse 3b. Of the voltage transducer circuits 11 and 12, the voltage transducer circuit 11 having an output voltage of 5 V has a high step-up ratio of approximately 4 times or greater. As described below, a charge pump circuit is arranged at the output stage. Thus, the voltage can be output in a stable manner. The voltage transducer circuits 13 and 15 are operated by power output from the voltage transducer circuit 11. The voltage transducer circuit 14 is operated by power output from the voltage transducer circuit 12. The voltage transducer circuits 11 to 15 of the power output unit 10 are operated in response to the switching pulse from the control IC 9. The voltage transducer circuits 11 to 15 output predetermined voltages to the load and includes terminals for feeding back the output voltages to the control IC 9.

Figure 2:
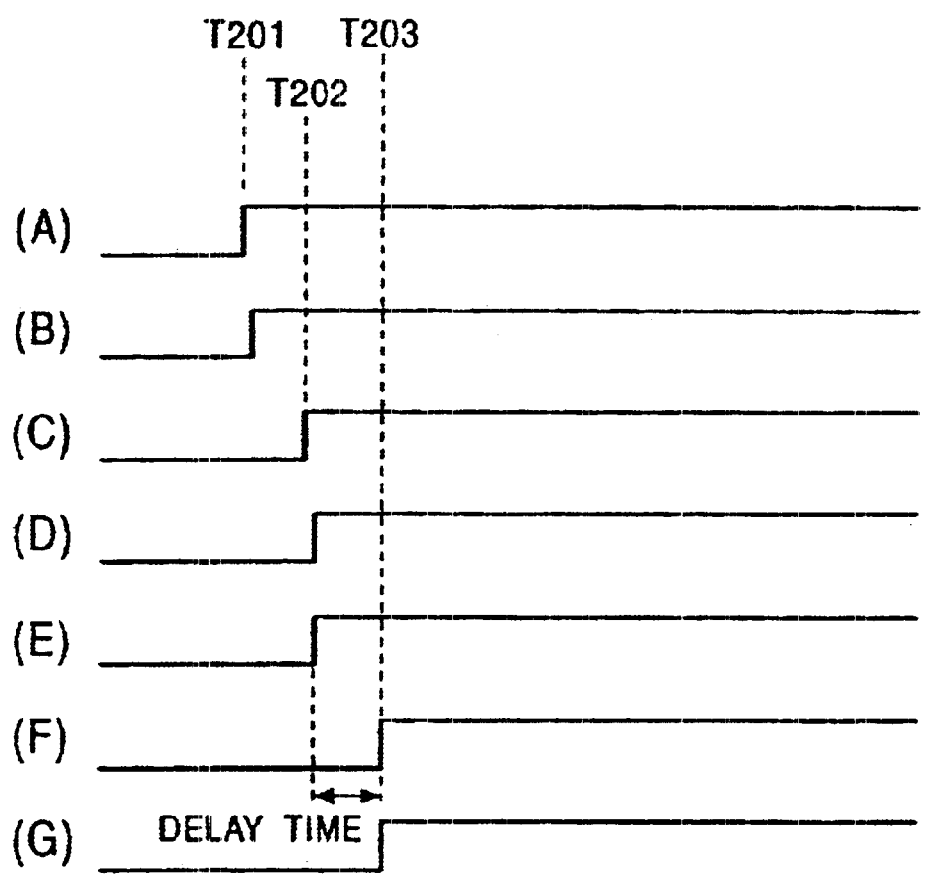
FIG. 2 is a timing chart showing signal timing at each portion in the power supply apparatus when the power supply apparatus is activated.

The operation of the power supply apparatus 1 upon activation will now be described. FIG. 2 shows signal timing at each portion in the power supply apparatus 1 upon activation.

At time T201, for example, a dry cell is connected as the DC power supply 2 (trace (A) in FIG. 2). The voltage is applied via the fuse 3a to the voltage transducer circuit 4, and the voltage boosted to 4 V is output (trace (B) in FIG. 2). The output voltage is supplied via the reset IC 6 to the interface microcomputer 5, and the interface microcomputer 5 is activated. At this time, the current consumed by the interface microcomputer 5 is sufficiently small. Even if the output voltage of the DC power supply 2 is reduced to a voltage less than or equal to 1 V, the interface microcomputer 5 is reliably activated.

At time T202, the power supply switch 5a of the interface microcomputer 5 is turned ON (trace (C) in FIG. 2), and the interface microcomputer 5 outputs an activation signal (trace (D) in FIG. 2). Receiving the activation signal, the switch 7 enters an ON state. The output voltage from the voltage transducer circuit 4 is supplied to the power supply terminal 9a of the control IC 9 (trace (E) in FIG. 2), and the control IC 9 enters a standby state. The activation signal supplied to the delay circuit 8 is delayed. At time T203, the delayed activation signal is supplied to the activation control pin 9b of the control IC 9 in the standby state (trace (F) in FIG. 2). As a result, the control IC 9 is activated, starts oscillating a switching pulse for the voltage transducer circuits 11 to 15 of the voltage output unit 10, and controls the operation of the voltage transducer circuits 11 to 15 of the voltage output unit 10 (trace (G) in FIG. 2).

As described above, the control IC 9 is driven by the output voltage from the voltage transducer circuit 4, which is generated by boosting the output voltage of the DC power supply 2. Under a heavy load having load power of greater than or equal to 25 mW, if the output voltage from the DC power supply 2 is reduced to a voltage less than or equal to 1 V, a switching pulse having a predetermined output level and a duty ratio can be oscillated in a stable manner. Due to the operation of the interface microcomputer 5, the switch 7, and the delay circuit 8, after the control IC 9 receives a voltage supplied from the voltage transducer circuit 4 and enters a standby state, the control IC 9 receives the activation signal that has passed through the delay circuit 8 and starts controlling the operation of the voltage output unit 10. Thus, under a heavy load, the control IC 9 can reliably receive a voltage output from the voltage transducer circuit 4 when being activated and thus can be normally activated. Using the interface microcomputer 5, the power supply voltage is applied to the control IC 9 when the control IC 9 is activated. As a result, the power consumed by the control IC 9 can be reduced.

The voltage output unit 10 will now be described.

In the voltage output unit 10, the voltage transducer circuits 11 and 12 are operated by power output from the DC power supply 2. Of the voltage transducer circuits 11 and 12, the voltage transducer circuit 11 having an output voltage of 5 V has a relatively high step-up ratio of approximately 4 times or greater. Thus, the charge pump circuit is arranged at the output stage in order that the stable boosting operation can be performed.

Figure 3:
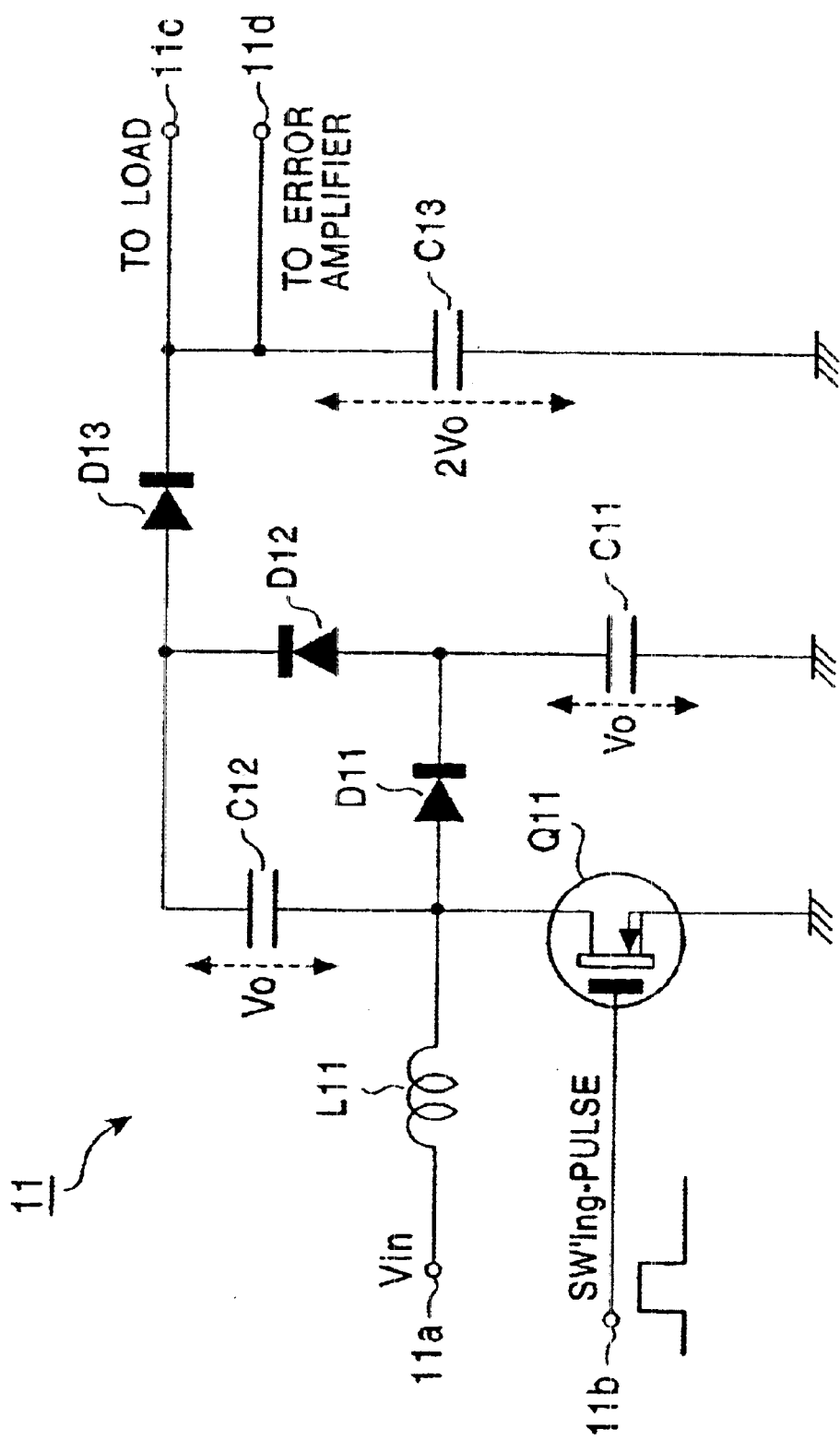
FIG. 3 is a circuit diagram showing the circuit configuration of a voltage transducer circuit having an output voltage of 5 V.

FIG. 3 shows the circuit configuration of the voltage transducer circuit 11.

The voltage transducer circuit 11 includes, as input terminals, a power supply terminal 11a for receiving an output voltage from the DC power supply 2 and a pulse input terminal 11b for receiving a switching pulse from the control IC 9. Also, the voltage transducer circuit 11 includes, as output terminals, an output terminal 11c for outputting a voltage of 5 V to the load and a feedback terminal 11d for feeding back the same voltage to the error amplifier included in the control IC 9.

As shown in FIG. 3, the voltage transducer circuit 11 includes a transistor Q11 having a gate connected to the pulse input terminal 11b and a source being grounded; a choke coil L11 having a first end connected to the power supply terminal 11a and a second end connected to the drain of the transistor Q11; a diode D11 having an anode connected to the node between the transistor Q11 and the choke coil L11; a capacitor C11 having a first end connected to the cathode of the diode D11 and a second end being grounded; a diode D12 having an anode connected to the cathode of the diode D11; a capacitor C12 having a first end connected to the drain of the transistor Q11 and a second end connected to the cathode of the diode D12; a diode D13 having an anode connected to the cathode of the diode D12; and a capacitor C13 having a first end connected to the cathode of the diode D13 and a second end being grounded. Both the output terminal 11c (to the load) and the feedback terminal 11d (to the error amplifier) are connected to the node between the diode D13 and the capacitor C13.

The transistor Q11 is an n-channel MOS-FET. In response to a switching pulse from the pulse input terminal 11b, the transistor Q11 enters an ON or OFF state. Accordingly, the transistor Q11 functions as a switching element. The diodes D11, D12, and D13 are Schottky diodes.

The voltage transducer circuit 11 includes the components of a known step-up converter including the transistor Q11, the choke coil L11, the diode D11, and the capacitor C11 and a two-stage charge pump circuit including the diode D12, the capacitor C12, the diode D13, and the capacitor C13, which is arranged at the output stage.

Figure 4:
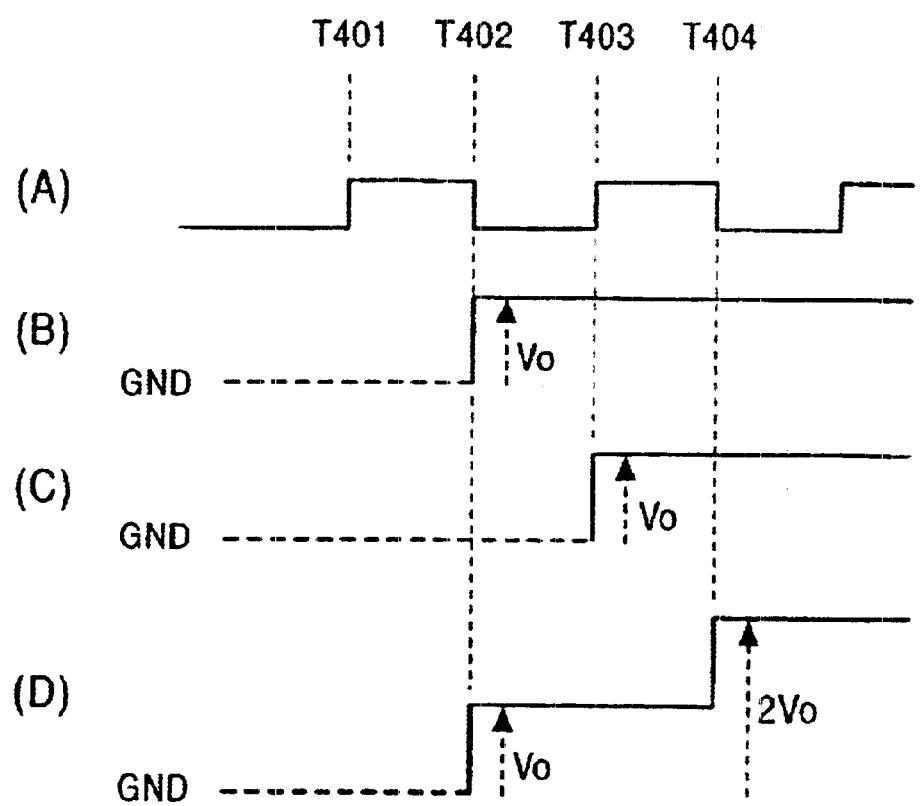
FIG. 4 is a timing chart showing the concept of signal output timing at each portion in the voltage transducer circuit having an output voltage of 5 V.

FIG. 4 shows the concept of signal output timing at each portion in the voltage transducer circuit 11. Using FIG. 4, the operation of the voltage transducer circuit 11 will now be described. In FIG. 4, the duty ratio of the switching pulse is regarded as 1:1 in order to simplify the description. In the following description, the voltage drops by the diodes D11, D12, and D13 are ignored.

At time T401, the pulse input terminal 11b inputs a switching pulse (trace (A) in FIG. 4), and the transistor Q11 is turned ON. The choke coil L11 is excited, and the magnetic energy is stored. At time T402, the switching pulse input is cut off, and the transistor Q11 is turned OFF. The choke coil L11 releases the magnetic energy, thus generating a voltage V1. A voltage $V_0$ generated by superimposing an input voltage Vin from the power supply terminal 11a on the voltage V1 is applied to both ends of the capacitors C11 and C13 (traces (B) and (D) in FIG. 4), and hence the capacitors C11 and C13 are charged. The voltage $V_0$ is the output voltage of the known step-up converter including the transistor Q11, the choke coil L11, the diode D11, and the capacitor C11.

At time T403, the switching pulse is supplied (trace (A) in FIG. 4), and the transistor Q11 is again turned ON. At this time, due to the charge in the capacitor C11, the capacitor C12 is charged through the diode D12 in a conducting state (trace (C) in FIG. 4), and the voltage $V_0$ is generated at both ends of the capacitor C12. At this time, the diode D11 enters a cut-off state and prevents the charge in the capacitor C11 from flowing to the transistor Q11. Also, the diode D13 enters a cut-off state and prevents the charge in the capacitor C13 from leaking to the transistor Q11. Subsequently, the choke coil L11 is again excited.

At time T404, the switching pulse is cut off (trance (A) in FIG. 4), and the transistor Q11 is turned OFF. The voltage $V_0$ at both ends of the capacitor C12 is superimposed on the voltage $V_0$ generated at the drain of the transistor Q11, and the capacitor C13 is charged by the sum voltage $2V_0$. At both ends of the capacitor C13, the voltage $2V_0$ is generated (trace (D) in FIG. 4). At this time, the cathode voltage of the diode D12 is $2V_0$, and the anode voltage is $V_0$. Thus, the diode D12 enters a cut-off state, and the capacitor C11 is charged by the voltage $V_0$.

By repeating the above-described operation, the voltage $2V_0$, which is twice the output voltage of the known step-up converter, is always generated at both ends of the capacitor C13 (trace (D) in FIG. 4). This voltage $2V_0$ is smoothed by the capacitor C13, and the smoothed voltage is output from the output terminal 11c to the load. At the same time, the feedback terminal 11d supplies the same voltage $2V_0$ to the error amplifier in the control IC 9, and the voltage $2V_0$ is compared with a predetermined voltage. In accordance with the comparison signal, the switching pulse output from the oscillation circuit is controlled. The output voltage from the output terminal 11c is also supplied as power supply to the voltage transducer circuits 13 and 15.

In the voltage transducer circuit 11, a further higher step-up ratio can be achieved by adding more charge pump circuit stages. For example, when an additional one-stage charge pump circuit is provided at the output stage of the voltage transducer circuit 11 shown in FIG. 3, a first end of a capacitor in the charge pump circuit is connected to the cathode of the diode D12, and the anode of a diode in the charge pump circuit is connected to the cathode of the diode D13. When a plurality of charge pump circuit stages are provided at the output stage, where the total number of stages is represented by M, the output voltage that is approximately M times greater than that of the known step-up converter can be achieved.

In the voltage transducer circuit 11 having the charge pump circuit at the output stage, where the multiplication factor of the charge pump is represented by N, time during which the transistor Q11 is turned ON is represented by Ton, and time during which the transistor Q11 is turned OFF is represented by Toff, the relationship between the input voltage Vin of the power supply terminal 11a and the output voltage Vout of the output terminal 11c is expressed by:

$$Vout = \frac{N \times (Ton + Toff) \times Vin}{Toff} \qquad (2)$$

In the power supply apparatus 1 in which a dry cell is used as the DC power supply 2, the voltage Vin may have a value around 1 V. For example, a case in which Vin is 1 V, Vout is 5 V, and N=2 is assumed. Then, the ratio Ton:Toff=3:2, and the duty ratio in the Ton period is 60%. Thus, the duty ratio has more tolerance. Under a heavy load having load power of 25 mW or greater, when Vin is reduced to 1 V or less, the power supply apparatus 1 can be reliably activated and can output a predetermined voltage. In the steady operation, the duty ratio has tolerance. Thus, the power supply apparatus 1 can operate stably in response to a fluctuation of Vin. When the power supply apparatus 1 is activated or operated steadily, as described above, the control IC 9 is activated by the output voltage from the voltage transducer circuit 4. Even if the output level of the DC power supply 2 using the dry cell decreases, a switching pulse having a predetermined output level and a duty ratio can be stably supplied to the voltage transducer circuit 11. Accordingly, the activation and the operation become more stable.

By adjusting the number of stages of the charge pump circuit to be added so that the magnification factor N can be arbitrarily set, the step-up ratio can be arbitrarily set. Accordingly, the duty ratio of the preset switching pulse relative to the output voltage can be set to a range in which the operation is stable. Even when the step-up ratio is increased, the activation is reliable and the operation is stable.

The circuit configuration of each of the other voltage transducer circuits 12 to 15 in the voltage output unit 10 will now be described. The voltage transducer circuit 12 for outputting a voltage of 3 V is only required to be capable of approximately tripling a voltage generated by the DC power supply 2. Concerning the voltage transducer circuit 13 for outputting the highest voltage of 15 V, by using the output voltage from the voltage transducer circuit 11 for outputting a voltage of 5 V as power supply, the step-up ratio can be suppressed to three times. Even when these voltage transducer circuits 12 and 13 each have a configuration similar to that of the known step-up converter, the duty ratio of the switching pulse is not greatly biased, and the voltage transducer circuits 12 and 13 can be operated in a stable manner.

Figure 5:
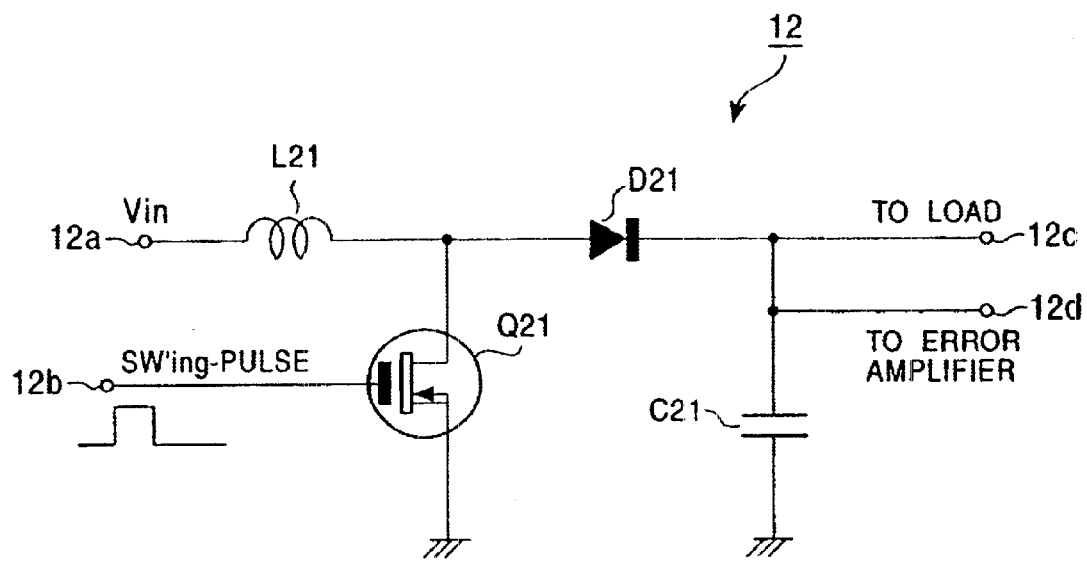
FIG. 5 is a circuit diagram showing the circuit configuration of a voltage transducer circuit having an output voltage of 3 V.

FIG. 5 shows the circuit configuration of the voltage transducer circuit 12 as a typical example of these voltage transducer circuits. In the voltage transducer circuit 13, a transistor, a choke coil, a diode, and a capacitor are arranged in a similar manner.

Figure 8:
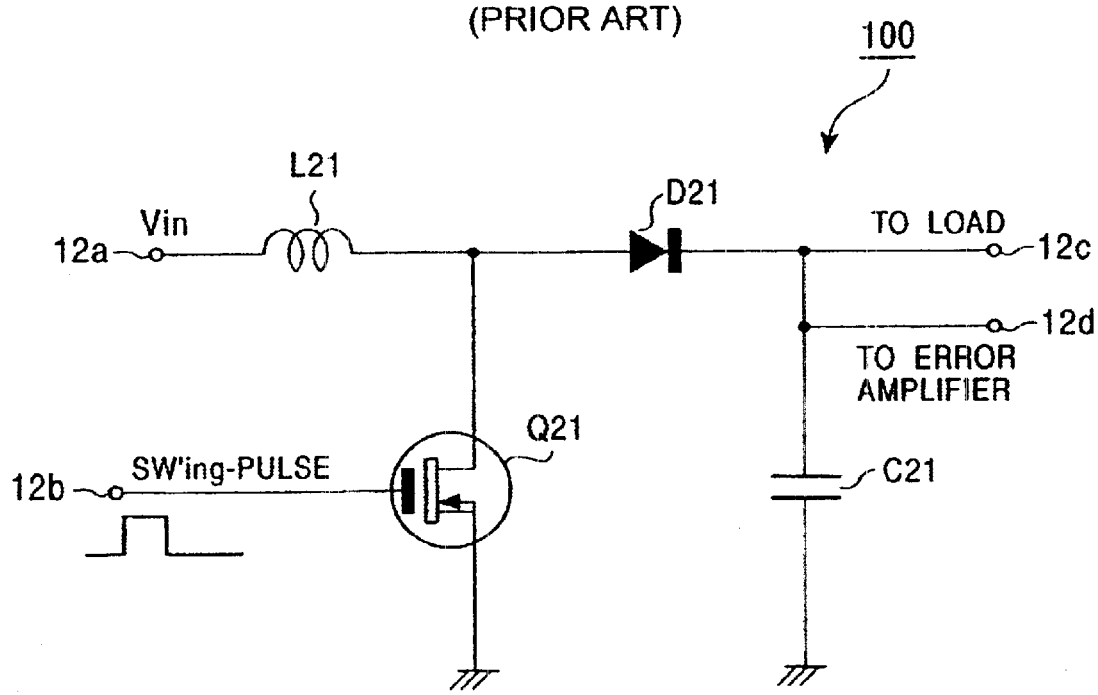
FIG. 8 is a circuit diagram showing the circuit configuration of a known step-up voltage transducer circuit.

The voltage transducer circuit 12 shown in FIG. 5 has a configuration similar to that of a voltage transducer circuit 100 in FIG. 8, which is shown as the known step-up converter. The same reference symbols are given to the same components, and a description of the circuit configuration is omitted.

In the voltage transducer circuit 12, when a transistor Q21 changes from an ON to OFF state, the back electromotive voltage due to the magnetic energy of a choke coil L21 is superimposed on the voltage of a power supply terminal 12a, and a capacitor C21 is charged by this voltage. When the transistor Q21 is turned ON the next time, this voltage is smoothed by the capacitor C21, and the smoothed voltage is output to an output terminal 12c and a feedback terminal 12d. As a result, the boosted voltage can be obtained.

In the voltage transducer circuit 12, the duty ratio of the switching pulse is less biased. As described above, the switching pulse can be stably supplied from the control IC 9. Even if the output voltage of the DC power supply 2 is reduced, the operation is stable. In the voltage transducer circuit 13 having a similar configuration, as described above, the step-up ratio is suppressed by using a voltage of 5 V, which is stably output from the voltage transducer circuit 11. Accordingly, in addition to the stable supply of the switching pulse, a high voltage of 15 V can be output in a stable manner.

Figure 6:
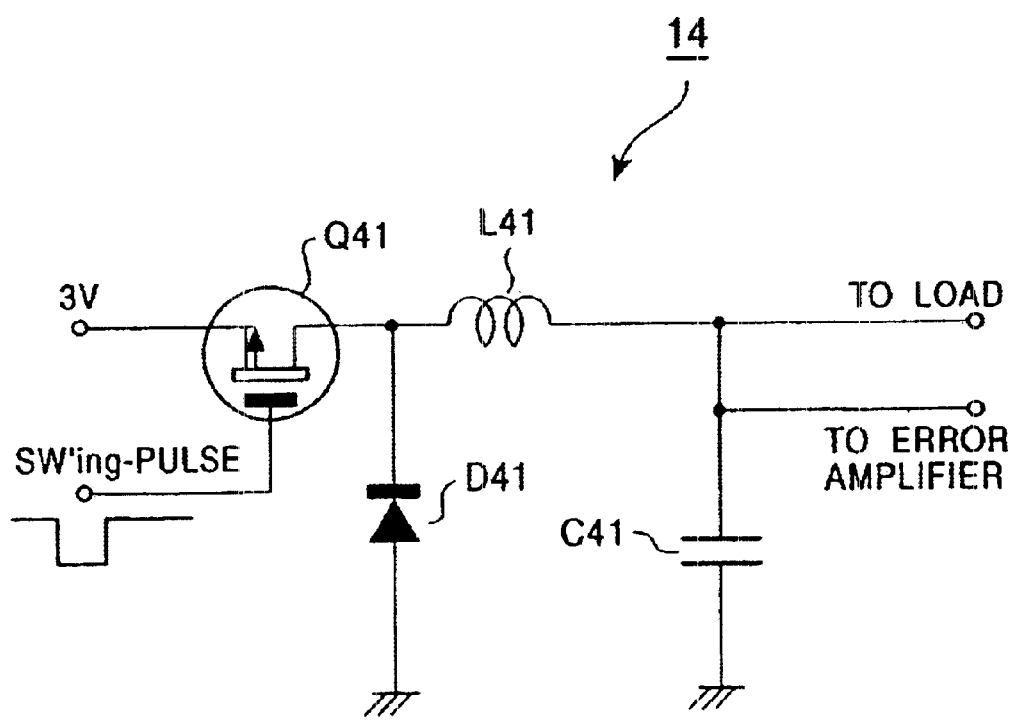
FIG. 6 is a circuit diagram showing the circuit configuration of a voltage transducer circuit having an output voltage of 1.5 V.

FIG. 6 shows the circuit configuration of the voltage transducer circuit 14.

The voltage transducer circuit 14 shown in FIG. 6 is a known general step-down converter. The voltage transducer circuit 14 includes a transistor Q41, which is a p-channel MOS-FET having a source for receiving the output voltage of the voltage transducer circuit 12 and a gate for receiving the switching pulse from the control IC 9; a diode D41 having an anode being grounded and a cathode connected to the drain of the transistor Q41; a choke coil L41 having a first end connected to the drain of the transistor Q41 and a second end for outputting a voltage to the load and the error amplifier; and a capacitor C41 having a first end connected to the output side of the choke coil L41 and a second end being grounded.

In the voltage transducer circuit 14, when the switching pulse is supplied and the transistor Q41 is turned ON, the choke coil L41 is excited by the difference between the input voltage and the output voltage, and the diode D41 is cut off. Subsequently, when the transistor Q41 is turned OFF, the diode D41 becomes conducting, and the capacitor C41 is charged with the magnetic energy by the choke coil L41. A voltage lower than the input voltage is generated at both ends of the capacitor C41, and the voltage is output to the load and the error amplifier.

When a voltage of 1.5 V is output, this voltage overlaps with the output voltage range of the DC power supply 2. When the configuration is such that the voltage is directly supplied from the DC power supply 2, the operation may become unstable depending on a fluctuation of voltage. In the voltage transducer circuit 14, a voltage of 3 V is stably supplied from the voltage transducer circuit 12, and the supplied voltage is stepped down. Accordingly, the stable activation and the steady operation can be achieved.

Figure 7:
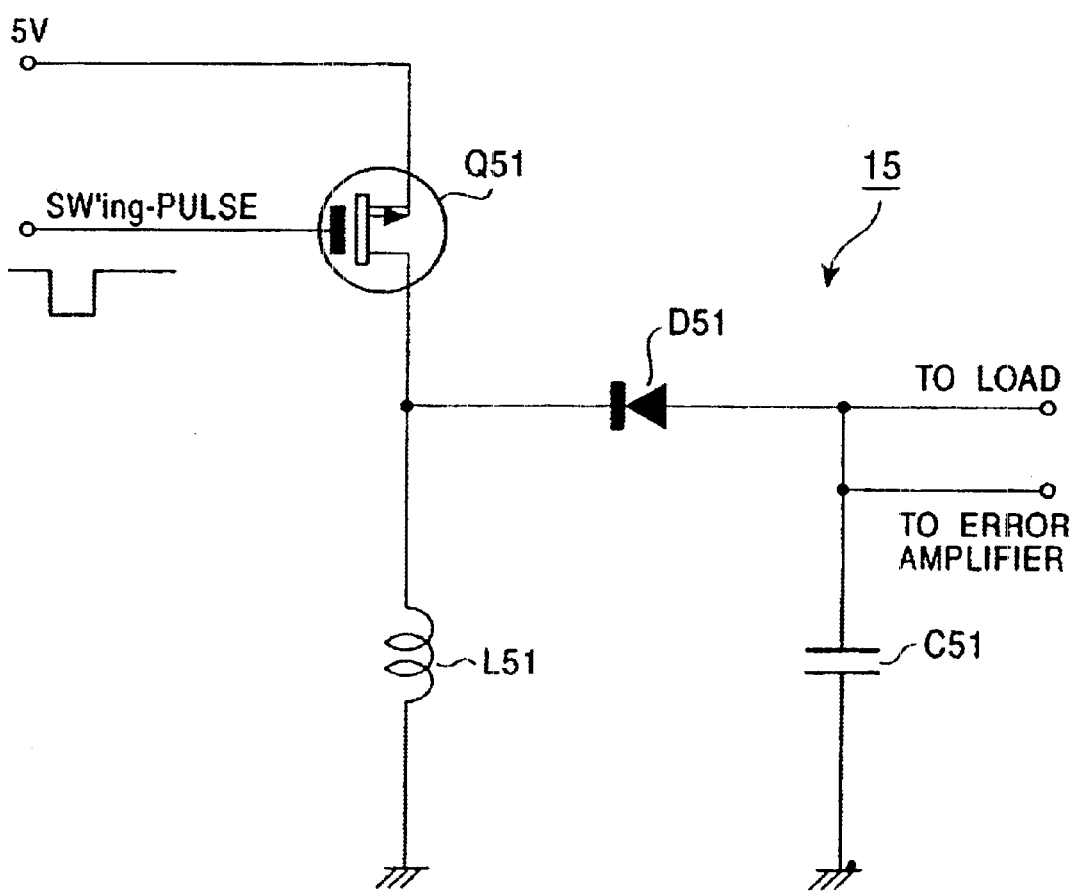
FIG. 7 is a circuit diagram showing the circuit configuration of a voltage transducer circuit having an output voltage of −7.5 V.

FIG. 7 shows the circuit configuration of the voltage transducer circuit 15.

The voltage transducer circuit 15 shown in FIG. 7 is a known general inverter converter. The voltage transducer circuit 15 includes a transistor Q51, which is a p-channel MOS-FET having a source for receiving the output voltage of the voltage transducer circuit 11 and a gate for receiving the switching pulse form the control IC 9; a choke coil L51 having a first end connected to the drain of the transistor Q51 and a second end being grounded; a diode D51 having a cathode connected to the drain of the transistor Q51 and an anode for outputting a voltage to the load and the error amplifier; and a capacitor C51 having a first end connected to the anode of the diode D51 and a second end being grounded.

In the voltage transducer circuit 15, when the switching pulse is supplied and the transistor Q51 is turned ON, the choke coil L51 is excited by the input voltage from the voltage transducer circuit 11, and the diode D51 is cut off. Subsequently, when the transistor Q51 is turned OFF, the diode D51 becomes conducting, and the capacitor Q51 is charged with the magnetic energy by the choke coil L51. At this time, a negative voltage is generated at both ends of the capacitor C51. The negative voltage is output to the load and the error amplifier.

In order that the voltage transducer circuit 15 can output a voltage of −7.5 V, when the output voltage of the DC power supply 2 is directly boosted, the step-up ratio is high, and the duty ratio of the switching pulse is extremely biased. As a result, the operation becomes unstable. In order to solve this problem, a voltage of 5 V is stably supplied from the voltage transducer circuit 11, and the duty ratio can thus have more tolerance. Accordingly, the stable activation and the steady operation can be achieved.

As described above, the voltage output unit 10 uses the voltage transducer circuit 11 having the charge pump circuit for receiving a voltage of 5 V from the DC power supply 2. By boosting the output voltage to a voltage higher than that of the known step-up converter, even under a heavy load, a relatively high voltage compared with that of the DC power supply 2 can be output in a stable manner.

In the above-described power supply apparatus 1, the delay circuit 8 for delaying the activation signal for the control IC 9 is provided as a separate external circuit. Alternatively, for example, a dedicated port for outputting a delayed activation signal can be provided in the interface microcomputer 5. In the interior of the interface microcomputer 5, predetermined delay timing is generated. In accordance with the timing, the activation signal is output from the dedicated port to the activation control pin 9b of the control IC 9.

Also, the voltage transducer circuits 11 to 15 in the voltage output unit 10 and the voltage transducer circuit 4 can be integrated in the same IC. The control IC 9 for the voltage output unit 10 and a control circuit (not shown) for supplying the switching pulse to the voltage transducer circuit 4 and controlling the operation thereof can be formed in the same IC.

What is claimed is:

1. A power supply apparatus for regulating a voltage generated by a DC power supply and for outputting the voltage to a predetermined load, comprising:

first voltage transducer means for boosting the voltage generated by the DC power supply;

second voltage transducer means for converting the voltage generated by the DC power supply to a predetermined voltage and for outputting the converted voltage to the predetermined load;

operation control means driven by an output voltage from the first voltage transducer means, the operation control means outputting a switching pulse in accordance with reception of an activation signal and controlling the operation of the second voltage transducer means; and activation control means for inputting the output voltage from the first voltage transducer means to the operation control means and, after a predetermined period of time, inputting the activation signal to the operation control means.

2. A power supply apparatus according to claim 1, wherein the activation control means comprises:

activation signal output means for outputting the activation signal;

open/close means for conducting the output voltage from the first voltage transducer means to the operation control means when the activation signal is received; and activation signal delay means for delaying the activation signal and for outputting the delayed activation signal to the operation control means.

3. A power supply apparatus according to claim 2, wherein the activation signal output means is driven by the output voltage from the first voltage transducer means.

4. A power supply apparatus according to claim 1, wherein the second voltage transducer means includes a charge pump circuit arranged at the output stage in order to boost or invert the voltage generated by the DC power supply.

5. A power supply apparatus according to claim 4, wherein the second voltage transducer means comprises:

a step-up voltage transducer circuit including a switching element having a gate receiving the switching pulse and a source being grounded, a first choke coil having a first end receiving the output voltage from the DC power supply and a second end connected to the drain of the switching element, a first diode having an anode connected to the switching element, and a first capacitor having a first end connected to the cathode of the first diode and a second end being grounded;

a first stage of the charge pump circuit including a second diode having an anode connected to the cathode of the first diode and a second capacitor having a first end connected to the drain of the switching element and a second end connected to the cathode of the second diode; and a second stage of the charge pump circuit including a third diode having an anode connected to the cathode of the second diode and a cathode for outputting a voltage to the predetermined load and for feeding back a voltage to the operation control means and a third capacitor having a first end connected to the cathode of the third diode and a second end being grounded.

6. A power supply apparatus according to claim 4, wherein the charge pump circuit having three or more stages is arranged at the output stage of the second voltage transducer means.

7. A power supply apparatus according to claim 4, further comprising third voltage transducer means, the operation of the third voltage transducer means being controlled by the operation control means, and the third voltage transducer means converting an output voltage from the second voltage transducer means to a predetermined voltage and outputting the converted voltage.

8. A power supply apparatus according to claim 1, wherein the first and second voltage transducer means are arranged as a single semiconductor integrated circuit.

9. A power supply apparatus according to claim 1, wherein the first and second voltage transducer means and the operation control means are arranged as a single semiconductor integrated means.

* * * * *